(12) United States Patent
Creamer et al.

(10) Patent No.: US 7,486,784 B2
(45) Date of Patent: *Feb. 3, 2009

(54) BILL PAYMENT SERVICE

(75) Inventors: Thomas E. Creamer, Boca Raton, FL (US); Peeyush Jaiswal, Boca Raton, FL (US); Victor S. Moore, Boynton Beach, FL (US); Scott Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 923 days.

This patent is subject to a terminal disclaimer.

(21) Appl. No.: 10/918,065

(22) Filed: Aug. 12, 2004

(65) Prior Publication Data

US 2006/0034440 A1   Feb. 16, 2006

(51) Int. Cl.
*H04M 15/00* (2006.01)
*H04M 5/00* (2006.01)
*H04M 3/00* (2006.01)

(52) U.S. Cl. ............... 379/121.01; 379/265.02; 379/266.1

(58) Field of Classification Search ............ 379/114.01, 379/114.28, 115.01, 115.03, 121.01, 122, 379/127.01, 265.01, 265.02, 265.07, 265.11, 379/309

See application file for complete search history.

(56) References Cited

U.S. PATENT DOCUMENTS

| 5,007,084 | A | 4/1991 | Materna et al. |
| 5,870,456 | A | 2/1999 | Rogers |
| 6,317,745 | B1 | 11/2001 | Thomas et al. |
| 6,606,744 | B1 | 8/2003 | Mikurak |
| 6,744,868 | B2 * | 6/2004 | Mani ................. 379/201.02 |
| 7,043,004 | B1 * | 5/2006 | Khuc et al. ........... 379/265.01 |
| 7,099,445 | B2 * | 8/2006 | Creamer et al. ....... 379/142.06 |
| 2002/0049671 | A1 | 4/2002 | Trende et al. |
| 2002/0116331 | A1 | 8/2002 | Cataline et al. |
| 2003/0022655 | A1 | 1/2003 | Bogat |
| 2005/0069123 | A1 * | 3/2005 | Castro et al. ........ 379/265.09 |
| 2006/0034436 | A1 * | 2/2006 | Creamer et al. ....... 379/114.01 |

* cited by examiner

*Primary Examiner*—Binh K Tieu
(74) *Attorney, Agent, or Firm*—Richard A. Tomlin, Esq.; Steven M. Greenberg, Esq.; Carey Rodriguez Greenberg & Paul LLP

(57) ABSTRACT

A method for processing the payment of a bill in the bill payment service can include detecting within a PSTN an attempt to establish a telephone call between a caller and a call center configured to process bill payments. An identity for the calling party can be resolved externally to the call center. Also, a telephonic connection can be established between the caller and the call center. Finally, the resolved identity can be forwarded to the call center over a data communications link which is separate and apart from the established telephonic connection. Preferably, the resolving step can include querying a LIDB through a name resolution adapter disposed in the PSTN for identifying information for the caller. Moreover, the resolving step can be performed responsive to receiving an SS7 message in an SCP to set up the telephonic connection between the caller and the call center.

10 Claims, 3 Drawing Sheets

BILL PAYMENT SERVICE

BACKGROUND OF THE INVENTION

1. Statement of the Technical Field

The present invention relates to delivering subscriber services for a telephone subscriber, and more particularly to providing bill payment services in a public switched telephone network (PSTN).

2. Description of the Related Art

The intelligent network of today bears little semblance to the PSTN of old. In fact, the term "intelligence" has little to do with the operation of the conventional PSTN. Rather, the conventional PSTN of old incorporates a massive complex of switching matrices and transport trunks that, through the electronic equivalent of "brute force", forge the interconnections necessary to call completion. More particularly, for decades for every call processed the PSTN relied upon each successive switch to route a voice signal to the next. Still, the modern volume of calls processed within the conventional PSTN demands a faster, more streamlined approach to call routing.

To overcome the elements of the brute force aspect of the conventional PSTN, physically separate signaling networks have been grafted upon the transport and switching PSTN elements to oversee call set-up and billing. These "out-of-band" adjuncts speed routing data and commands directly to the switches involved, establishing all the necessary links prior to the actual transmission of a call. Consequently, with "out-of-band" signaling the PSTN has become "conscious" of the operations it is to perform prior to their execution. As a result, the PSTN has become a more flexible beast, capable even of substantial logic.

The development of the "out-of-band" protocol, Signaling System 7 (SS7), has led to the widespread deployment of intelligent network technology. In SS7, signaling links transmit routing packets between switches. Consequently, specialized SS7 Signaling Transfer Points (STPs) appeared to shepherd routing messages from local switches onto a high-capacity packet switches for distribution to other switches, STPs and call-related databases, such as the Line Information Database (LIDB), the Local Number Portability (LNP) database, the Toll Free Calling database and other databases containing additional call routing instructions. And, so, the agility of high-speed computer networking began exerting control over the raw power of the PSTN.

The marriage of convenience between SS7 and the PSTN soon produced the Advanced Intelligent Network (AIN)—an architecture where centralized databases control call processing. Logic ported via STPs to select switches now have become widely distributed throughout the network. AIN-capable switches also have begun to function as interactive signaling-platforms. Equipped with resident software triggers, AIN capable switches now can halt a call in progress long enough to query Service Control Points (SCPs)—databases containing service logic and subscriber information—which can provide instruction as to how to route, monitor, or terminate the call. The PSTN of today now effectively includes long-term memory as well as intelligence. Accordingly, the modern local exchange carrier holds the means to deploy such advanced telecommunications features such as telephone number portability, wireless roaming, call waiting and a host of other subscriber options.

The LIDB is a database configured for coupling to the PSTN through an SCP. The LIDB typically includes amorphous records arranged to store information regarding telephone callers, such as the name of the caller, the address of the caller, billing information for the caller, and the like. By storing invariable information regarding the caller, such as the name, address and billing method, many intelligent telephonic services can be provided over the PSTN through a simple query to the LIDB. In this regard, several local exchange carriers have deployed independent LIDB access services to facilitate the deployment of intelligent telephonic services which can exploit the invariant information stored within the LIDB.

Despite the wealth of information associated with a telephone caller stored in the LIDB, the LIDB seems to remain an untapped resource suitable only for advanced telephony billing applications. Accordingly, many conventional inconveniences remain prevalent in the world of the call center. For instance, though a name of a caller can be resolved prior to the completion of a phone call, in many cases, telephone callers still must exhaustively establish their respective identities in order to conduct a phone payment of a bill. Typically, the required information can include a social security number, account number, home address, phone number, date of birth and mother's maiden name. Consequently, the potential convenience of telephonic bill payment can be lost among the clutter of identity establishment procedures.

SUMMARY OF THE INVENTION

The present invention addresses the deficiencies of the art in respect to the telephonic payment of a bill and provides a novel and non-obvious method, system and apparatus for the payment of a bill through the PSTN. In accordance with the present invention, a method for processing payment of a bill over a PSTN can include detecting within the PSTN an attempt to establish a telephone call between a caller and a call center configured to process bill payments. An identity for the calling party can be resolved externally to the call center. Also, a telephonic connection can be established between the caller and the call center. Finally, the resolved identity can be forwarded to the call center over a data communications link which is separate and apart from the established telephonic connection. Preferably, the resolving step can include querying a LIDB through a name resolution adapter disposed in the PSTN for identifying information for the caller. Moreover, the resolving step can be performed responsive to receiving an SS7 message in an SCP to set up the telephonic connection between the caller and the call center.

A system for processing payment of a bill over a PSTN can include a telephone subscriber database disposed in the PSTN. The database can include records correlating telephone subscribers with identifying information. The system also can include a name resolution adapter coupled to the database and disposed within the PSTN. The adapter can have a configuration for transmitting identifying information for a telephone subscriber to a billing service in a call center over a data communications network which is external to the PSTN. The adapter further can have a configuration for performing the transmitting concurrently with establishing a telephonic connection between the telephone subscriber and the call center. Preferably, the telephone subscriber database is a LIDB. In particular, the name resolution adapter can be disposed in an SCP in the PSTN as can be the telephone subscriber database.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for processing bill payments in a PSTN. In accordance with the present invention, a placed call within the PSTN can be processed by logic disposed within the PSTN to identify the caller for the placed call. Once the caller has been identified, further identifying information can be retrieved from a data store within the PSTN and the further identifying information can be electronically provided to a bill payment service over a data communications network. Concurrently, the placed call can be completed to call terminating equipment in the call center. Using the further identifying information, a bill payment can be processed for the caller without requiring an exhaustive prompting of personally identifying information over the PSTN.

Figure 1:
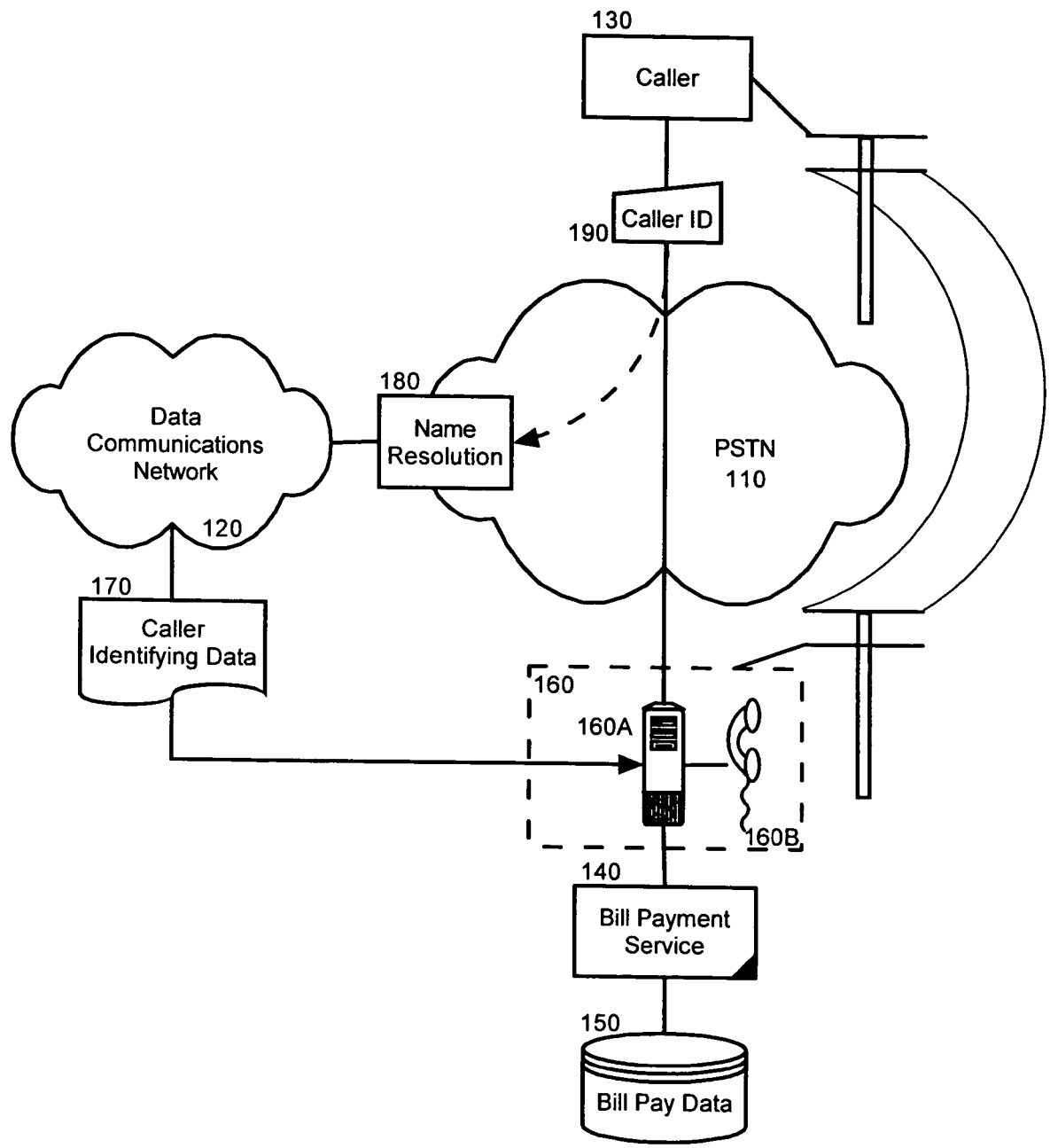
FIG. 1 is a block diagram illustrating a system, method and apparatus for processing bill payments in a PSTN according to the inventive arrangements.

In further illustration, FIG. 1 is a block diagram illustrating a process for name-alias based delivery of services in a PSTN according to the inventive arrangements. Specifically, callers 130 can be coupled telephonically to a call center 160 having a bill management information system 160A and one or more telephone communication devices 160B. The call center 160 can include a bill payment service 140 which can process bill payment data 150 through interactions with one or more callers 130 over the PSTN 110. In this regard, callers 130 can telephonically pay bills managed by the bill payment service 140 by calling the call center 160 through the PSTN 110. In the present invention, however, the callers 130 need not engage in an exhaustive authentication process as the authentication of the callers 130 can occur primarily externally to the calls themselves.

In more particular explanation, as a caller 130 initiates a telephone call in the PSTN 110, a name resolution adapter 180 disposed within the PSTN 110 can capture caller data 190 for the telephone used by the caller 130 to place the telephone call in order to identify the caller 130. Using the caller data 190, the name resolution adapter 180 can produce specific caller identification data 170 for the caller 130, for instance a name, address, phone number, credit card number, or account number, to name a few. More particularly, the name resolution adapter 180 can query one or more databases disposed within the PSTN 110, including a LIDB, to obtain the specific caller identification data 170 based upon the caller data 190.

When the specific caller identification data 170 has been acquired, the specific caller identification data 170 can be provided to the bill management information system 160A over a data communications network linkage. Concurrently, the call between the caller 130 and the telephone communications device 160B in the call center 160 can be established over the PSTN 110. Using the specific caller identification data 170, the bill payment service 140 can retrieve the billing records for the caller 130 from the bill payment data 150. Subsequently, the caller 130 can be prompted to manage one or more bills, for instance by paying all or a portion of a retrieved bill. Notably, the caller 130 can be prompted to manage one or more bills without first requiring extensive authentication in part because the authentication will be obviated by the specific identification of the caller by the name resolution adapter 180.

Figure 2:
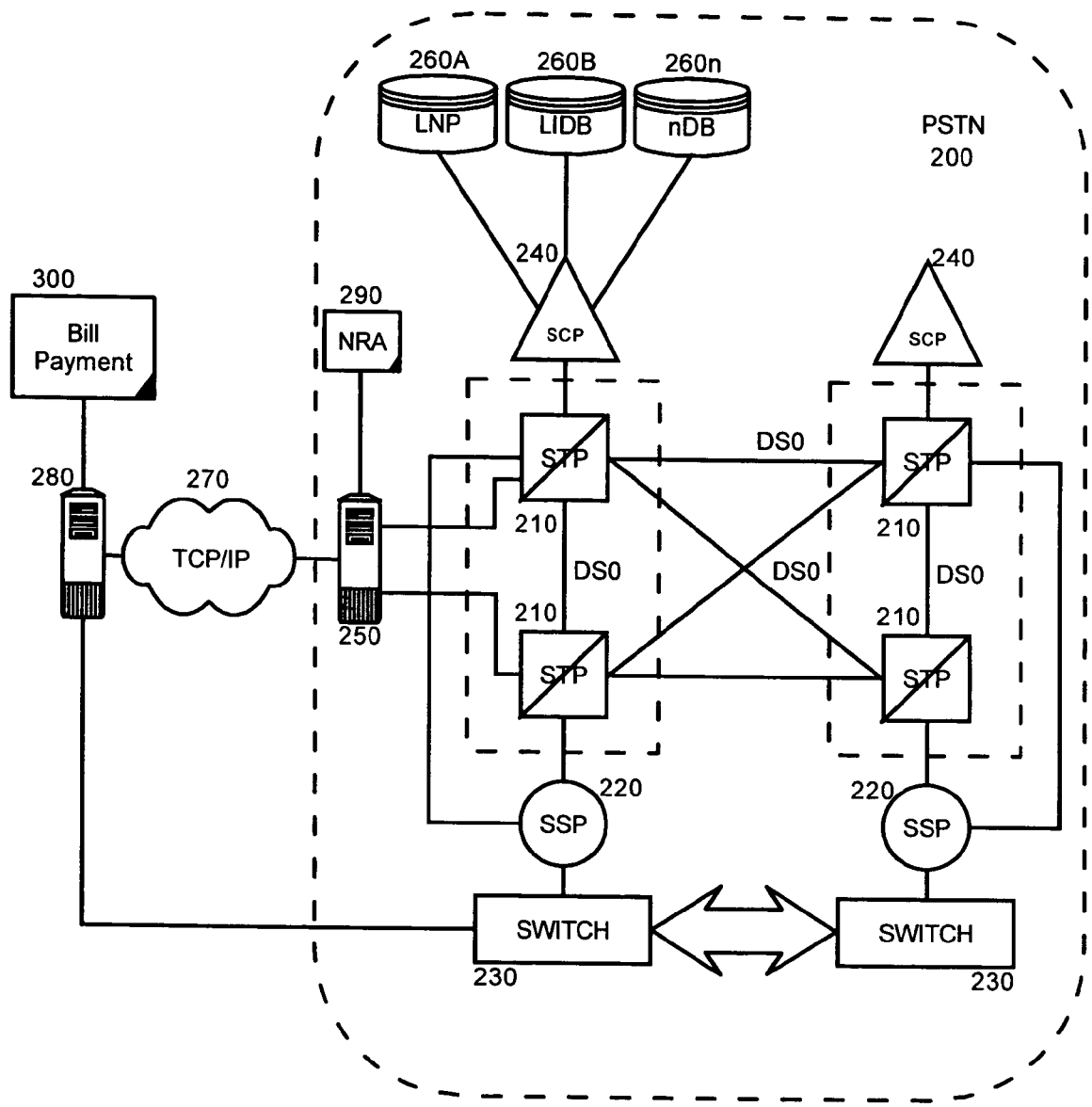
FIG. 2 is a schematic illustration of a system for processing bill payments using identifying information acquired within the PSTN; and, FIG. 3 is a flow chart illustrating a method for processing bill payments in the system of FIG. 2.

To further illustrate the preferred embodiments of the present invention, FIG. 2 is a schematic illustration of a system for processing bill payments using identifying information acquired within the PSTN. As shown in FIG. 2, a system for processing bill payments using identifying information acquired within the PSTN can include one or more telephonic switches 230 coupled to one another within a PSTN 200. Each of the switches 230 can be communicatively linked to a service switching point (SSP) 220 coupled to an out-of-band signaling network comprised of a multiplicity of signal transfer points (STP) 210. Each STP 210 can be cross-connected to other ones of the STPs 210 in the PSTN so as to form an inter-network of switched communications links to support out-of-band signaling as is well-known in the art.

One or more switchless nodes each referred to as an SCP 240 can be communicatively linked to the out-of-band signaling network via one of the STPs 210 as is well-known in the art and embodied within the SS7 signaling network. The SCP 240 can be coupled to one or more databases 260A, 260B, 260n which can be configured to store invariant data such as the name, address and billing information for callers. For example, the databases 260A, 260B, 260n can include a local number portability (LNP) database, a LIDB, or any other such database which can be accessed within an SCP 240.

Importantly, as is well-known in the art, the information stored within the databases 260A, 260B, 260n can be stored in amorphous records in nothing more than a flat file database, an object database or a relational database. In any event, through the communicative linkages between the SCP 240, the STP 210 and the databases 260A, 260B, 260n, transaction capabilities application part (TCAP) messages can be processed in the SCP 240 to access the invariant data in the databases 260A, 260B, 260n. In this way, calls processed through the switch 230 can access logic in the SCP 240 and data in the databases 260A, 260B, 260n through the SSP 220.

Importantly, a name resolution adapter 290 can be coupled to the out-of-band network comprised of inter-connected STPs 210 to access data and logic through the SCP 240 through an exchange of messages such as TCAP messages. The name resolution adapter 290 can include a gateway node 250 having both an interface to the PSTN 200 and also an interface to a data communications network 270 such as an Internet Protocol driven network 270. In this way, data received through the PSTN 200, and more particularly from accessing the databases 260A, 260B, 260n in the PSTN 200 can be passed within IP packets to an enterprise application 280 over the data communications network 270. Also, as the enterprise application 280 can be coupled to a switch 230 within the PSTN 200 through an associated adapter, data disposed within the databases 260A, 260B, 260n regarding an incoming call can be processed within the enterprise application 280.

In operation, the name resolution adapter 290 can monitor calls placed to a switch 230 to which the enterprise application 280 has been coupled. As calls are received in the switch 230, the name resolution adapter 290 can receive respective TCAP messages from the STP 210 coupled to the switch 230. Using the TCAP messages, the name resolution adapter 290 can create additional TCAP messages to query the LIDB 260B to identify the callers. For each TCAP message querying the LIDB 260B, the LIDB 260B can return the identity of the caller, for instance the caller's name, or other identification such as caller's address. Once the name resolution adapter 290 has received the identity of the caller from the LIDB 260B, the name resolution adapter 290 can transmit the identity to the enterprise application 280 over the data communications network 270. The enterprise application 280 subsequently can correlate the caller identity received from the name resolution adapter 290 with a corresponding call received through the switch 230.

It will be recognized by the skilled artisan that by establishing the identity of the caller through the operation of the name resolution adapter 290, an exhaustive authentication exchange will not be required as between a caller and the enterprise application to determine the identity of the caller. Rather, as the name resolution adapter 290 within the PSTN 200 will be considered trustworthy to the enterprise application 280, the identity of the caller as specified by the name resolution adapter 290 will suffice for the purpose of authentication the caller. As such, a bill payment process 300 can process the payment of a bill simply by correlating the identity of the caller as specified by the name resolution adapter 290 with internally managed bill payment data for the caller.

Figure 3:
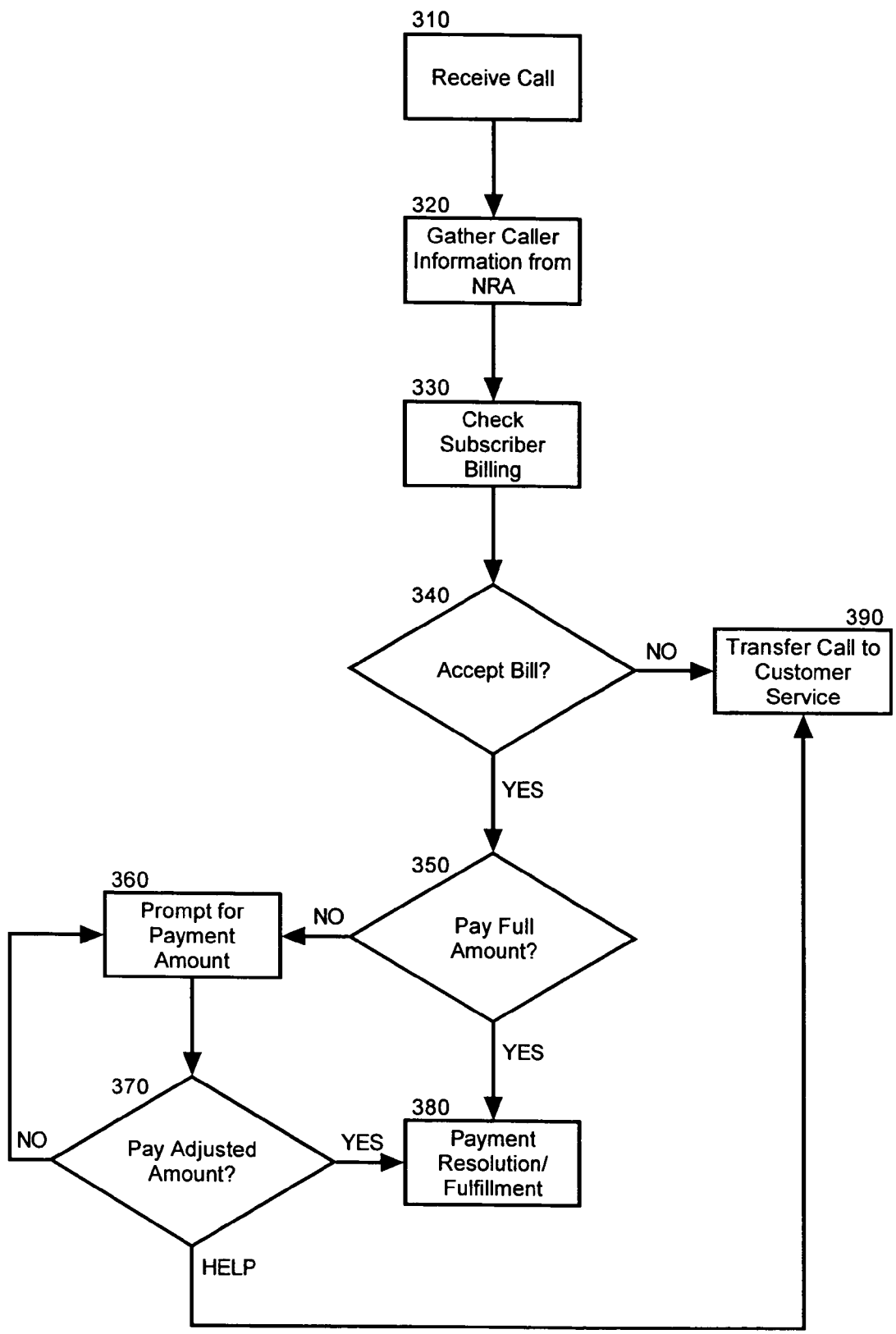

Specifically, FIG. 3 is a flow chart illustrating a method for processing bill payments in the system of FIG. 2. Beginning in block 310, a call can be received in the call center and in block 320, caller information for the call can be gathered from a name resolution adapter disposed in the PSTN. In block 330, billing information can be retrieved for the caller based upon the caller information received from the name resolution adapter. Subsequently, the caller can be prompted to with information relating to a bill based upon the retrieved billing information.

In decision block 340, it can be determined whether the caller has accepted the billing information as accurate. If not, in block 390 the call can be transferred to a customer service process, or possibly a live customer service agent. Otherwise, the caller can be prompted to pay the bill associated with the billing information. If in decision block 350, it is determined the caller has agreed to pay the bill in full, in block 380 the bill can be paid. Otherwise, in block 360 the caller can be prompted to specify a partial payment of the bill. In decision block 370 it can be determined whether the caller agrees to pay a partial amount of the bill. If so, the partial amount can be paid in block 380. Otherwise, the caller can be prompted again in block 360. Alternatively, the caller can request help in which case the call can be transferred to a customer service process in block 390.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for processing payment of a bill over a public switched telephone network (PSTN), the method comprising the steps of:
    detecting within the PSTN an attempt to establish a telephone call between a caller and a call center configured to process bill payments;
    resolving an identity for said calling party externally to said call center;
    establishing a telephonic connection between said caller and said call center; and,
    forwarding said resolved identity to said call center over a data communications link which is separate and apart from said established telephonic connection.

2. The method of claim 1, wherein said resolving step comprises the step of querying a line item database (LIDB) through a name resolution adapter disposed in the PSTN for identifying information for said caller.

3. The method of claim 1, further comprising the step of performing said resolving step responsive to receiving a signaling system 7 (SS7) message in a service control point (SCP) to set up said telephonic connection between said caller and said call center.

4. A system for processing payment of a bill over a public switched telephone network (PSTN), the system comprising:
    a telephone subscriber database disposed in the PSTN, said database comprising records correlating telephone subscribers with identifying information; and,
    a name resolution adapter coupled to said database and disposed within the PSTN, said adapter having a configuration for transmitting identifying information for a telephone subscriber to a billing service in a call center over a data communications network which is external to the PSTN, said adapter having a further configuration for performing said transmitting concurrently with establishing a telephonic connection between said telephone subscriber and said call center.

5. The system of claim 4, wherein said telephone subscriber database is a line item database (LIDB).

6. The system of claim 4, wherein said name resolution adapter is disposed in a service control point (SCP) in the PSTN.

7. The system of claim 6, wherein said telephone subscriber database also is disposed in said SCP in the PSTN.

8. A machine readable storage having stored thereon a computer program for processing payment of a bill over a public switched telephone network (PSTN), the computer program comprising a routine set of instructions which when executed by a machine cause the machine to perform the steps of:

detecting within the PSTN an attempt to establish a telephone call between a caller and a call center configured to process bill payments;

resolving an identity for said calling party externally to said call center;

establishing a telephonic connection between said caller and said call center; and, forwarding said resolved identity to said call center over a data communications link which is separate and apart from said established telephonic connection.

9. The machine readable storage of claim 8, wherein said resolving step comprises the step of querying a line item database (LIDB) through a name resolution adapter disposed in the PSTN for identifying information for said caller.

10. The machine readable storage of claim 8, further comprising a routine set of instructions for causing the machine to perform the additional step of performing said resolving step responsive to receiving a signaling system 7 (SS7) message in a service control point (SCP) to set up said telephonic connection between said caller and said call center.

* * * * *